United States Patent
Mendenhall et al.

(10) Patent No.: US 6,673,173 B1
(45) Date of Patent: Jan. 6, 2004

(54) GAS GENERATION WITH REDUCED $NO_x$ FORMATION

(75) Inventors: Ivan V. Mendenhall, Providence, UT (US); Robert D. Taylor, Hyrum, UT (US); David W. Parkinson, North Ogden, UT (US); Robert G. Smith, North Ogden, UT (US); Karl K. Rink, Liberty, UT (US)

(73) Assignee: Autoliv ASP. Inc., Ogden, UT (US)

( * ) Notice: Subject to any disclaimer, the term of this patent is extended or adjusted under 35 U.S.C. 154(b) by 4 days.

(21) Appl. No.: 09/605,104

(22) Filed: Jun. 28, 2000

Related U.S. Application Data

(63) Continuation-in-part of application No. 09/495,975, filed on Feb. 2, 2000, now Pat. No. 6,332,404.

(51) Int. Cl.$^7$ .............................................. C06B 31/00
(52) U.S. Cl. ........................................................ 149/45
(58) Field of Search ..................... 149/36, 45; 280/741; 60/219

(56) References Cited

U.S. PATENT DOCUMENTS

| | | | |
|---|---|---|---|
| 3,647,393 A | * | 3/1972 | Leising et al. ................. 23/281 |
| 3,959,042 A | * | 5/1976 | McCulloch et al. ..... 149/19.92 |
| 5,139,588 A | | 8/1992 | Poole |
| 5,514,230 A | | 5/1996 | Khandhadia |
| 5,592,812 A | * | 1/1997 | Hinshaw et al. |
| 5,673,935 A | * | 10/1997 | Hinshaw et al. |
| 5,725,699 A | * | 3/1998 | Hinshaw et al. |
| 5,735,118 A | * | 4/1998 | Hinshaw et al. |
| 5,765,866 A | | 6/1998 | Canterberry et al. |
| 5,970,703 A | * | 10/1999 | Hinshaw et al. |
| 6,039,820 A | * | 3/2000 | Hinshaw et al. |
| 6,077,371 A | | 6/2000 | Lundstrom et al. |
| 6,077,372 A | * | 6/2000 | Mendenhall et al. |
| 6,083,331 A | * | 7/2000 | Taylor et al. |
| 6,096,147 A | * | 8/2000 | Taylor et al. |
| 6,103,030 A | * | 8/2000 | Taylor et al. |
| 6,132,538 A | * | 10/2000 | Mendenhall et al. |
| 6,143,104 A | * | 11/2000 | Blomquist |
| 6,231,702 B1 | * | 5/2001 | Blomquist |
| 6,241,281 B1 | * | 6/2001 | Hinshaw et al. |
| 6,332,404 B1 | * | 12/2001 | Rink et al. .................. 102/530 |

FOREIGN PATENT DOCUMENTS

WO          98/06682          2/1998

* cited by examiner

*Primary Examiner*—Michael J. Carone
*Assistant Examiner*—Aileen B. Felton
(74) *Attorney, Agent, or Firm*—James D. Erickson; Sally J. Brown

(57) ABSTRACT

Gas generating compositions containing or including a sufficient quantity of a non-nitrate containing ammonia source whereby, upon reaction of the gas generating composition, $NO_x$ products are present in the product gas in a reduced amount as compared to reaction product gas resulting from reaction of the same composition without said quantity of non-nitrate containing ammonia source. Also disclosed are associated methods of reducing $NO_x$ products present in an effluent of a gas generating composition that upon combustion forms gas useful for inflating a vehicle occupant safety restraint device.

6 Claims, No Drawings

GAS GENERATION WITH REDUCED $NO_x$ FORMATION

CROSS REFERENCE TO RELATED APPLICATION

This application is a continuation-in-part of application Ser. No. 09/495,975, filed on Feb. 2, 2000, now U.S. Pat. No. 6,332,404, issued Dec. 25, 2001. The disclosure of this related patent application is hereby incorporated by reference herein and made a part hereof, including but not limited to those portions which specifically appear hereinafter.

BACKGROUND OF THE INVENTION

This invention relates generally to gas generation and, more particularly, to the generation of gas in a fashion such as minimizes or avoids $NO_x$ production (where x typically equals 1 or 2).

Gas generating chemical compositions and formulations are useful in a variety of different contexts. One significant use for such compositions is in the operation of automotive inflatable restraint airbag cushions. It is well known to protect a vehicle occupant using a cushion or bag, e.g., an "airbag cushion," that is inflated or expanded with gas when the vehicle encounters sudden deceleration, such as in the event of a collision. In such systems, an airbag cushion is normally housed in an uninflated and folded condition to minimize space requirements. Upon actuation of the system, the cushion begins to be inflated, in a matter of no more than a few milliseconds, with gas produced or supplied by a device commonly referred to as an "inflator."

Various gas generant compositions have heretofore been proposed for use in vehicular occupant inflatable restraint systems. Gas generant compositions commonly utilized in the inflation of automotive inflatable restraint airbag cushions have previously most typically employed or been based on sodium azide. Such sodium azide-based compositions, upon initiation, normally produce or form nitrogen gas. While the use of sodium azide and certain other azide-based gas generant materials satisfies various current industry specifications, guidelines and standards, such use may involve or raise potential concerns such as involving the safe and effective handling, supply and disposal of such gas generant materials.

In view thereof, various non-azide gas generant compositions have been developed for use in vehicular occupant inflatable restraint systems. These gas generant compositions typically incorporate or utilize various "non-azide" fuels such as may be used to produce or form nitrogen gas. These non-azide gas generant compositions can desirably be less toxic, easier to dispose of and more accepted by the general public, as compared to typical azide-based gas generants. Such non-azide fuel compositions, however, typically burn hotter (i.e., at a higher combustion temperature) than those compositions based on sodium azide. For example, sodium azide-based gas generants typically burn at temperatures in the range of about 1200 K to about 1600 K whereas various of such newly developed non-azide gas generants typically have combustion temperatures of 1800 K or more. Unfortunately, such higher combustion temperatures can in practice tend to favor the combustion production or formation of either or both: 1) increased or greater levels or relative amounts of particulates from molten combustion products and 2) increased or greater levels or relative amounts of carbon monoxide (CO) and nitrogen oxides ($NO_x$) combustion products.

The gas generant material inclusion of one or more slagging agents such as alumina, silica, or titania, for example, and such as forms a glass or glass-like substance at combustion temperatures has been developed as a means of addressing the production or formation of increased or greater levels or relative amounts of particulates.

The reduction of the levels or relative amounts of combustion products such as carbon monoxide and nitrogen oxides from such non-azide gas generant materials, however, has proven to be a more difficult problem to solve to the extent desired or required such as to permit or facilitate the more widespread application and use of such gas generant materials. In particular, manipulation of the oxidizer/fuel ratio in such material compositions is generally only effective to decrease or reduce either the $NO_x$ or the CO concentration in the effluent, typically at the expense of increasing the effluent concentration of the other. For example, if the relative amount of oxidizer in such a gas generant formulation is increased to a level greater than that required for conversion of the fuel to carbon dioxide, nitrogen, and water, the carbon monoxide concentration in the combustion products typically decreases but there is an accompanying increase in the concentration of $NO_x$ in the combustion products. Conversely, if the relative amount of fuel in the formulation is increased to a level greater than that required for complete consumption of the oxidizer oxygen to form carbon dioxide, nitrogen, and water, the $NO_x$ concentration of the combustion products typically decreases but there is an accompanying increase in the concentration of CO in the combustion products. Thus, while the oxidizer to fuel ratio can be adjusted to reduce the concentration of carbon monoxide below the maximum concentration for carbon monoxide allowed, such adjustment typically results in the concentration of nitrogen oxides exceeding the maximum allowed concentration for nitrogen oxides. Similarly, while the oxidizer to fuel ratio can be adjusted to reduce the concentration of nitrogen oxides below the maximum concentration for nitrogen oxides allowed, such adjustment typically results in the concentration of carbon monoxide exceeding the maximum allowed concentration for carbon monoxide.

In view of the above, the reduction of the levels or relative amounts of combustion products such as carbon monoxide and nitrogen oxides from non-azide gas generant materials has been the subject of various efforts. These efforts have led to the identification of particular additives for use in conjunction with specific gas generant formulations.

For example, U.S. Pat. No. 5,139,588 discusses the pyrotechnic gas generant inclusion of an additive comprising an alkali metal salt of an inorganic acid or organic acid selected from the group consisting of carbonate and azole to reduce oxides of nitrogen. These additives are used in conjunction with a gas generant formulation containing an azole or metal salts of azole fuels and an oxygen containing oxidizer selected from the group consisting of alkaline earth metal nitrates, perchlorates, and alkali metal nitrates and perchlorates.

U.S. Pat. No. 5,514,230 discusses the non-azide gas generating composition inclusion of a built-in catalyst composed of an alkali metal salt, an alkaline earth metal salt or a transition metal salt of tetrazole, bitetrazole or triazole or a transition metal oxide to promote the conversion of CO and $NO_x$ to $CO_2$ and $N_2$, respectively.

U.S. Pat. No. 5,765,866 discusses the use of 5–25 weight percent mica in combination with a gas generant which contains an azide or non-azide, preferably an azole or tetrazole salt, as a fuel and an oxidizer selected from the group consisting of alkaline earth metal nitrates, chlorates, and perchlorates, and alkali metal nitrates, chlorates, and perchlorates, transition metal oxides, and ammonium nitrate or mixtures thereof to yield products having a reduced content of undesirable gases such as $NO_x$ and CO.

Unfortunately, the additives identified in these prior patents may not be as effective as desired in reducing the level or amount of either or both CO and $NO_x$ without an increase in the other, or to allow reduction of the level or amount of both CO and $NO_x$ to allowable levels. For example, azole-containing compounds can undesirably react with copper such as may be present in various common gas generant oxidizers thus causing or resulting in aging and performance variability problems. Further, gas generant inclusion of transition metal oxides in the relative amounts commonly required to effect desired reduction of CO and $NO_x$ commonly results in significant gas yield sacrifices. Also, gas generant inclusion of mica has been found to significantly reduce the gas yield and burn rate of such gas generant materials.

Thus, there is a need and a demand for improved gas generating compositions which upon combustion form product gas useful for inflating a vehicle occupant safety restraint device as well as a manner of gas generation such as allows reduction in $NO_x$ levels or relative amounts without necessarily increasing the level or relative amount of CO in the resulting gas products.

SUMMARY OF THE INVENTION

A general object of the invention is to provide an improved gas generating composition that upon combustion forms product gas useful for inflating a vehicle occupant safety restraint device as well as methods of reducing $NO_x$ products present in the effluent of such gas generating compositions.

A more specific objective of the invention is to overcome one or more of the problems described above.

The general object of the invention can be attained, at least in part, in accordance with one embodiment of the invention through the inclusion or presence of a sufficient quantity of a non-nitrate containing ammonia source in the gas generating composition such that, upon reaction of the gas generating composition, $NO_x$ products are present in the product gas in a reduced amount as compared to reaction of the same composition without the quantity of non-nitrate containing ammonia source.

The prior art generally fails to provide gas generating compositions which upon combustion form product gas useful for inflating a vehicle occupant safety restraint device and do so in a manner such as allows reduction in $NO_x$ levels or relative amounts without necessarily increasing the level or relative amount of CO in the resulting gas products.

The invention further comprehends, in accordance with another embodiment of the invention, such a gas generating composition that includes:

greater than 30 and less than 70 percent by weight of a guanidine nitrate fuel component;

greater than 30 and less than 70 percent by weight of a metal ammine nitrate oxidizer component;

greater than 1 and less than 10 percent by weight of a metal oxide burn rate enhancing and slag formation additive; and greater than 1 and less than 12 percent by weight of the non-nitrate containing ammonia source whereby, upon reaction of the gas generating composition, $NO_x$ products are present in the product gas in a reduced amount as compared to reaction of the same composition without said quantity of non-nitrate containing ammonia source.

The invention still further comprehends a method of reducing $NO_x$ products present in an effluent of a gas generating composition that upon combustion forms gas useful for inflating a vehicle occupant safety restraint device. In accordance with yet another embodiment of the invention, one such method involves adding a non-nitrate containing ammonia source material to the gas generating composition in an amount sufficient whereby, upon reaction of the gas generating composition, $NO_x$ products are present in the effluent in a reduced amount as compared to reaction of the same composition without the non-nitrate containing ammonia source.

Other objects and advantages will be apparent to those skilled in the art from the following detailed description taken in conjunction with the appended claims.

DETAILED DESCRIPTION OF THE INVENTION

The present invention provides gas generating compositions that upon combustion form product gas, such as composed of one or more gaseous species, and such as may be used for the inflating of a vehicle occupant safety restraint device. As detailed below, the gas generating compositions of the invention include or contain a sufficient quantity of a non-nitrate containing ammonia source whereby, upon reaction of the gas generating composition, $NO_x$ products are present in the product gas in a reduced amount as compared to reaction of the same composition without the quantity of non-nitrate containing ammonia source.

Particular such non-nitrate containing ammonia sources useful in specific preferred embodiments of the invention include, either alone or in combination, ammonium sulfate $(NH_4)_2SO_4$ and one or more ammonium phosphates, such as $(NH_4)HPO$, $(NH_4)_2HPO_4$, or $(NH_4)H_2PO_4$, for example.

While the quantity or relative amount of such non-nitrate containing ammonia sources included in gas generant compositions in accordance with the invention will typically vary dependent on the desired or required extent of reduction in $NO_x$ products in the resulting combustion products, in practice, the gas generant composition inclusion of greater than 1 and less than 12 percent by weight of such a non-nitrate containing ammonia source is believed to be generally effective in realizing a practical and significant desired reduction in $NO_x$ products without undesirably sacrificing either or both generant gas yield and burn rate.

While the broader practice of the invention can be applied to various gas generant materials and compositions, such as known in the art, the invention is believed to have particular utility when used with various non-azide gas generant materials, including such recently developed gas generant materials as the burn rate-enhanced high gas yield non-azide gas generants disclosed in prior U.S. patent application Ser. No. 09/221,910, filed Dec. 28, 1998, whose disclosure is hereby incorporated herein in its entirety.

In particular, the invention can be advantageously applied to such or similar gas generant compositions such as provide or result in a very high gas output (e.g., generate in excess of about 3 moles of gas) and a relatively high burn rate (e.g., desirably in excess of 0.35 inches per second at 1000 psi, preferably in excess of 0.45 inches per second at 1000 psi).

One particularly preferred gas generating composition used in the practice of the invention and which upon combustion forms product gas useful for inflating a vehicle occupant safety restraint device includes or contains:

greater than 30 and less than 70 percent by weight of a guanidine nitrate fuel component;

greater than 30 and less than 70 percent by weight of a metal ammine nitrate oxidizer component;

greater than 1 and less than 10 percent by weight of a metal oxide burn rate enhancing and slag formation additive; and greater than 1 and less than 12 percent by weight of the non-nitrate containing ammonia source whereby, upon reaction of the gas generating composition, $NO_x$ products are present in the product gas in a reduced amount as compared to reaction of the same composition without said quantity of non-nitrate containing ammonia source.

Particular metal oxide burn rate enhancing and slag formation additives for use in the practice of the invention include those metal oxides containing a metal selected from the group consisting of Si, Al, Ti, Zr, Zn and mixtures thereof.

In addition, gas generating compositions in accordance with the invention may additionally contain or include one or more scavenging agents such as effective to form a non-volatile combustion product which contains the anion of the non-nitrate containing ammonia source. For example, preferred such scavenging agents in accordance with certain preferred embodiments of the invention comprise a metal compound of either or both copper and zinc. As will be appreciated by those skilled in the art and guided by the teachings herein provided, through such scavenging agent inclusion, release or escape of the anion of the non-nitrate containing ammonia source in the gaseous combustion products can be avoided or minimized, as may be desired in particular installations.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Comparative Example 1 and Examples 1 and 2

In Comparative Example 1 (CE 1), a gas generant formulation composition composed of 52.64 wt % guanidine nitrate, 35.01 wt % copper diammine dinitrate, 7.25 wt % ammonium nitrate, and 5.10 wt % silicon dioxide was pressed into tablets.

In Example 1 (EX 1), a gas generant composition was formed by dry blending 1.25 wt % of the non-nitrate ammonia source additive ammonium sulfate with a gas generant formulation composition such as used in Comparative Example 1 and then pressed into tablets.

In Example 2 (EX 2), a gas generant composition was formed by dry blending 2.00 wt % of the non-nitrate ammonia source additive ammonium sulfate with a gas generant formulation composition such as used in Comparative Example 1 and then pressed into tablets.

The gas generant tablets were then respectively loaded into a test inflator device equipped with a squib (electronic match) at one end to ignite the gas generant tablets. The test inflator device was mated to a 100-cubic foot tank. The gaseous species present in the tank at five (5) minutes after actuation were measured with an infrared spectrometer. The gas output (Gn) was also measured in terms of moles of generated gas per 100 grams of the respective gas generant composition. The results are shown in TABLE 1, below.

TABLE 1

| TEST | Gn (moles/100 grams) | EFFLUENT CONCENTRATION | | | | |
|---|---|---|---|---|---|---|
| | | Particles $(mg/m^3)$ | CO (ppm) | NO (ppm) | $NO_2$ (ppm) | $NH_3$ (ppm) |
| CE 1 | 3.65 | <100 | 20 | 33 | 24 | 0 |
| EX 1 | 3.65 | <100 | 20 | 30 | 11 | 0 |
| EX 2 | 3.66 | <100 | 20 | 29 | 8 | 0 |

Discussion of Results

As detailed in Table 1, the inclusion of the non-nitrate containing ammonia source, ammonium sulfate $(NH_4)_2SO_4$, was found to reduce the $NO_x$ level in effluent gas formed upon combustion of a tested gas generant composition, without detrimentally impacting gas yield. Further, no evidence of gaseous sulfur species was found in these test inflator deployments. Laboratory data shows that the sulfate ends up as a water soluble solid (probably cupric sulfate) in the combustion slag.

As those skilled in the art will appreciate, the specific mechanisms relating to formulation of $NO_x$ from the reaction of gas generant materials can be extremely complex, particularly where such formation occurs in the presence of either or both hydrocarbons (such as formed by or resulting from carbon-containing fuels) and ammonia (such as formed by or resulting from ammonium sulfate). At the present time, it is believed that the reduced formation of $NO_x$ is at least in part due to the liberation of ammonia from the ammonium sulfate and, the subsequent reaction of at least a portion of such ammonia with available $NO_x$. At the present time, the role of other chemical intermediate species is unknown. It is theorized that the ammonium group or resulting constituent or product of ammonium sulfate is effective to tie-up or otherwise occupy available nitrate groups $(NO_3)$, such as present in ammonium nitrate but absent in ammonium sulfate. Thus, the incorporation of an additive such as ammonium phosphate, $(NH_4)_2HPO_4$, which also exhibits an absence of the nitrate group, may produce or result in substantially the same effect on the level or relative amount of $NO_x$ present in resulting reaction products.

Thus, the invention provides gas generating compositions which upon combustion form product gas useful for inflating a vehicle occupant safety restraint device and does so in a manner such as allows reduction in $NO_x$ levels or relative amounts without necessarily increasing the level or relative amount of CO in the resulting gas products.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A gas generating composition that upon combustion forms product gas useful for inflating a vehicle occupant safety restraint device, the gas generating composition comprising:

greater than 30 and less than 70 percent by weight of a guanidine nitrate fuel component;

greater than 30 and less than 70 percent by weight of a metal ammine nitrate oxidizer component;

greater than 1 and less than 10 percent by weight of a metal oxide burn rate enhancing and slag formation additive; and greater than 1 and up to about 4 percent by weight of a non-nitrate containing ammonia source whereby, upon reaction of the gas generating composition, $NO_x$ products are present in the product gas in a reduced amount as compared to reaction of the same composition without said quantity of non-nitrate containing ammonia source, wherein the gas generating composition has a burn rate in excess of 0.45 inches per second at 1000 psi.

2. The gas generating composition of claim 1 wherein the non-nitrate containing ammonia source comprises an ammonium sulfate.

3. The gas generating composition of claim 1 wherein the non-nitrate containing ammonia source comprises an ammonium phosphate.

4. The gas generating composition of claim 1 wherein the composition has a combustion flame temperature of greater than about 1800 K.

5. The gas generating composition of claim 1 additionally comprising a scavenging agent effective to form a non-volatile combustion product which contains the anion of the non-nitrate containing ammonia source.

6. The gas generating composition of claim 5 wherein the scavenging agent comprises a metal compound of at least one metal selected from the group consisting of copper and zinc.

* * * * *